No. 754,264. Patented March 8, 1904.

UNITED STATES PATENT OFFICE.

HEINRICH WELTZ, OF LUDWIGSHAFEN-ON-THE-RHINE, GERMANY, ASSIGNOR TO BADISCHE ANILIN UND SODA FABRIK, OF LUDWIGSHAFEN-ON-THE-RHINE, GERMANY, A CORPORATION OF BADEN, GERMANY.

ANTHRACENE DYE AND PROCESS OF MAKING SAME.

SPECIFICATION forming part of Letters Patent No. 754,264, dated March 8, 1904.

Application filed April 10, 1903. Serial No. 152,069. (No specimens.)

*To all whom it may concern:*

Be it known that I, HEINRICH WELTZ, doctor of philosophy and chemist, a subject of the King of Bavaria, residing at Ludwigshafen-on-the-Rhine, in the Kingdom of Bavaria, Empire of Germany, have invented new and useful Improvements in Anthracene Coloring-Matters and Processes of Making Same, of which the following is a specification.

By the action on anthraquinon-beta-mono-sulfo-acid of concentrated sulfuric acid and mercury or mercury salts in the presence of phosphoric acid or arsenic acid and nitrous acid a new poly-hydroxy-anthraquinon-sulfo-acid can be obtained which is regarded as a "purpurin-sulfo-acid" and will hereinafter be referred to as such. I have discovered that this purpurin sulfo-acid on being treated with aromatic amido compounds can be converted into valuable coloring-matters which can be directly employed for dyeing. The treatment can be effected in an open or in a closed vessel with or without the addition of a solvent, such as water or alcohol, or of an agent assisting the reaction, such as boric acid, salts of amido compounds, hydrochloric acid, hydrobromic acid, hydrofluoric acid, sulfuric acid, phosphoric acid, benzoic acid, acetic acid, zinc chlorid, salts of the aforementioned acids, and the like. As amido compounds there can be employed anilin, ortho-toluidin, para-toluidin, xylidin, para-phenylen-diamin, benzidin, alpha-naphthylamin, beta-naphthylamin, and the like. Suitable temperatures for carrying out the reaction are in general those between one hundred and twenty and one hundred and ninety degrees centigrade (120°–190° C.;) but other temperatures may be employed. The products resulting from the reaction may or may not be homogenous.

The following examples will serve to further illustrate the nature of my invention, which, however, is not confined to these examples. The parts are by weight.

Example 1: Into one hundred and twenty (120) parts of sulfuric acid (containing ninety-six (96) per cent. of $H_2SO_4$) slowly introduce ten (10) parts of sodium nitrite while stirring well and then ten (10) parts of dry anthraquinon-beta-mono-sulfo-acid sodium salt, one (1) part of meta-arsenic acid (containing about sixty-five (65) per cent. $As_2O_5$,) and one and one-fifth ($1\frac{1}{5}$) parts of mercury sulfate. Heat the whole gradually during two (2) hours to a temperature of two hundred and ten degrees centigrade, (210° C.) The operation is to be stopped as soon as a test portion of the melt dissolved in water yields on addition of caustic-soda lye a blue-red coloration or until the solution in concentrated sulfuric acid is yellow-red and on the addition of boric acid becomes blue-red without the appearance of fluorescence. When cold, pour the whole into water, boil it up, add sufficient common salt, and cool and filter off the product which separates out. It can be purified by dissolving it in water and precipitating it by means of hydrochloric acid.

Example 2: Heat ten (10) parts of the product such as can be obtained according to the preceding Example 1 with one hundred (100) parts of anilin in an autoclave at a temperature of one hundred and sixty degrees centigrade (160° C.) until a test portion when treated with concentrated sulfuric acid does not yield a red, but a violet, solution. This is usually the case in from three to four (3–4) hours. Remove the excess of anilin from the reaction product by means of steam and salt out the new coloring-matter by means of common salt, or the melt can be poured into dilute hydrochloric acid, when the reaction product separates out. Collect by filtration, wash with dilute hydrochloric acid, and dry. It dyes unmordanted wool from the acid-bath violet and dyes chrome-mordanted wool dark blue. Condensation can also be effected in an open vessel and with the addition of boric acid or the like, if desired.

Example 3: Dissolve ten (10) parts of the product such as can be obtained according to the preceding Example 1 in forty (40) parts of water. Add fifty (50) parts of anilin and heat the whole in a reflux apparatus at a temperature of one hundred and thirty-five degrees centigrade (135° C.) until the mass becomes red-blue. Work up the product as explained in the foregoing Example 2.

Example 4: Heat together fifteen (15) parts of the product such as can be obtained according to the preceding Example 1, ten (10) parts of crystallized dry boric acid, and one hundred (100) parts of anilin at a temperature of one hundred and thirty-five degrees centigrade (135°) until the melt has become red-blue. Work up the melt as described in the preceding Example 2.

Example 5: Heat together in a reflux apparatus at a temperature of one hundred and fifty degrees centigrade (150° C.) fifteen (15) parts of the product such as can be obtained according to the preceding Example 1, fifty (50) parts of anilin hydrochlorid, and fifty (50) parts of anilin. When a test portion dissolved in concentrated sulfuric acid gives a blue-red solution which on the addition of boric acid becomes blue, which is generally the case in two (2) hours, discontinue the heating and blow off the excess of anilin by means of steam. The coloring-matter so obtained dyes unmordanted wool from the acid-bath and also wool mordanted with chrome or aluminium compounds somewhat redder than the coloring-matter of the preceding Example 4.

Example 6: Heat together in a reflux apparatus an intimate mixture of fifteen (15) parts of the product such as can be obtained according to the preceding Example 1, seventy-five parts (75) of para-toluidin, and eighty (80) parts of absolute alcohol at a temperature of one hundred and thirty-five degrees centigrade (135° C.) until a test portion dissolved in concentrated sulfuric acid yields a blue-red solution. When cold, pour the whole into dilute hydrochloric acid, collect the reaction product, and wash it with dilute hydrochloric acid and dry it. It dyes wool mordanted with chrome bluish-black. On treatment on the fiber with chromates the shades become gray-blue.

The temperatures, the proportions, and the ingredients in the above examples may be varied within wide limits.

The following table presents some of the properties of some of the coloring-matters obtainable according to my invention:

| Product of— | Solution in anilin. | Solution in pyridin. | Solution in concentrated sulfuric acid. | Becomes on addition of boric. | Aqueous solution on addition of caustic soda. | Aqueous solution on addition of ammonia. |
|---|---|---|---|---|---|---|
| Example 2 | Reddish blue | Violet | Violet | Green-blue | Red-blue to pure blue. | Blue-violet. |
| Example 4 | Blue-violet | Red-violet | Violet | Reddish blue | Blue | Blue-violet. |
| Example 5 | Red-violet | Red-violet | Reddish violet | Green-blue | Violet | Blue-red. |

I claim—

1. The process of manufacturing anthracene coloring-matter by treating anthraquinon-beta-mono-sulfo-acid with concentrated sulfuric acid and mercury in the presence of phosphoric acid and nitrous acid and then treating the resulting purpurin-sulfo-acid with an aromatic amido compound.

2. The anthracene coloring-matter such as can be obtained by heating the hereinbefore-defined purpurin-sulfo-acid with an aromatic amido body, which dissolves in concentrated sulfuric acid with a violet color, which solution on the addition of boric acid becomes blue, whose aqueous solution on the addition of caustic soda is blue to violet and on the addition of ammonia blue-violet to blue-red, which dyes chrome-mordanted wool black.

In testimony whereof I have hereunto set my hand in the presence of two subscribing witnesses.

HEINRICH WELTZ.

Witnesses:
ERNEST F. EHRHARDT,
H. W. HARRIS.